United States Patent [19]
Werle

[11] 3,863,142
[45] Jan. 28, 1975

[54] MAGNETIC FLUXMETER

[75] Inventor: Christian P. F. Werle, Panama City, Fla.

[73] Assignee: the United States of America, as represented by the Secretary of the Navy, Washington, D.C.

[22] Filed: Sept. 3, 1971

[21] Appl. No.: 177,836

[52] U.S. Cl................ 324/43 R, 324/41, 324/115, 340/4 R
[51] Int. Cl....................... G01r 33/02, G01r 15/08
[58] Field of Search............ 324/41, 43 R, 47, 115, 324/111, 8; 340/4 R

[56] References Cited
UNITED STATES PATENTS

| | | | |
|---|---|---|---|
| 2,943,306 | 6/1960 | Gray et al. | 324/41 |
| 3,126,510 | 3/1964 | McLaughlin et al. | 324/47 |
| 3,187,323 | 6/1965 | Flood et al. | 324/115 |
| 3,260,926 | 7/1966 | Coles | 324/43 R |
| 3,568,052 | 3/1971 | Anderson | 324/43 R |
| 3,577,136 | 5/1971 | Wolf | 324/43 R |
| 3,582,777 | 6/1971 | Wunderman | 324/115 |
| 3,629,697 | 12/1971 | Bouchiat et al. | 324/43 R |
| 3,731,752 | 5/1973 | Schad | 324/43 R |

*Primary Examiner*—Maynard R. Wilbur
*Assistant Examiner*—G. E. Montone
*Attorney, Agent, or Firm*—Richard S. Sciascia; Don D. Doty

[57] ABSTRACT

A magnetic fluxmeter is disclosed as having one or more signal processing channels, each of which incorporate an electrical loop magnetic flux sensing transducer, a high fidelity nanovoltmeter type preamplifier, an active integrator, a discharge circuit for changing the voltage integration range and, thus, the operational range center of said active integrator, and a scale change for causing a digital voltmeter to indicate the output signal from said active integrator on a scale that is sufficiently proportional thereto to substantially center it thereon, so as to thereby facilitate the accurate reading thereof. To monitor large geographical areas, a plurality of said signal processing channels may be employed and scanned, so that each of the outputs thereof will be timely indicated and/or recorded by a suitable readout.

11 Claims, 1 Drawing Figure

INVENTOR
CHRISTIAN P. F. WERLE

BY
*Doc A. Doty*
ATTORNEY

MAGNETIC FLUXMETER

STATEMENT OF GOVERNMENT INTEREST

The invention described herein may be manufactured and used by or for Government of the United States of America for governmental purposes without the payment of any royalties thereon or therefor.

FIELD OF THE INVENTION

The present invention relates, in general, to magnetic field detectors and, in particular, is a system for detecting the intrusion or passage of objects, such as ships and the like, through guarded areas from the magnetic field anomalies effected thereby.

DESCRIPTION OF THE PRIOR ART

Heretofore, a number of similar prior art devices have been employed for similar purposes; however, to date for many practical purposes, they leave something to be desired from sensitivity and accuracy standpoints. For example, some thereof are difficult to use and maintain. Others can only detect a limited range of magnetic field magnitudes, which precludes them from being used to accurately identify various types and sizes of ships passing over a given location from their flux signatures. Furthermore, they are severely limited with respect to the capability of detecting objects of different sizes and magnetic influences; hence, to a considerable extent, their use is restricted.

SUMMARY OF THE INVENTION

Fundamentally, the subject invention consists of a loop receiving transducer that is disposed around the area — be it large or small — that is to be monitored for the intrusion of moving vehicles or other objects. The data signal voltage generated thereby — as a result of the creation of an anomaly in the earth's magnetic field ambient thereto due to the presence of an intruding object — is amplified by a nanovolt null detector type preamplifier to enhance the signal-to-noise ratio of said data signal, thereby increasing the sensitivity of the total instrument to a considerable degree. An active integration network is employed to process the amplified data signal and to achieve a high degree of integration accuracy, thereby causing the readout accuracy to be increased proportionally. In addition, a scale change circuit is employed that is capable of varying the preamplifier gain ranges, thereby insuring optimum accuracy as a result of readout being effected at substantially the center of the indicator scale.

The foregoing elements constitute a single channel magnetic fluxmeter; however, any number of similar channels may, if circumstances so warrant, be combined therewith. In such instance, a scanner is interposed between the output of each thereof and the input of the readout, so that the magnetic flux anomalies being respectively detected thereby are timely indicated and/or recorded, preferably in digital form, by the readout.

It has been determined by actual experimental operations that the subject invention overcomes many of the disadvantages of the known prior art. Accordingly, for most practical purposes, it constitutes a considerable improvement thereover.

It is, therefore, an object of this invention to provide an improved magnetic fluxmeter.

Another object of this invention is to provide an improved method and means for detecting anomalies in a magnetic field, such as those which occur in the magnetic fields in the earth and in space.

Still another object of this invention is to provide an improved method and means for measuring slowly varying magnetic fields under water, underground, along the surface of the earth, in the atmosphere, and in space.

A further object of this invention is to provide an improved method and means for locating and identifying magnetic field influencing objects, elements, and substances.

Another object of this invention is to provide an improved instrument for detecting and identifying the intrusion of predetermined objects within a predetermined environmental area.

Still another object of this invention is to provide an improved inductive loop metallic object locator.

Still another object of this invention is to provide an improved device for monitoring and counting the passing of various and sundry objects past a given location.

A further object of this invention is to provide an improved method and means for detecting the presence of objects, such as guns, bombs, large knives, and the like, on or contiguously disposed about the body or traveling bag of a person about to enter an airplane.

Another object of this invention is to provide an improved method and means for detecting and identifying an underwater swimmer and/or diver within a given area.

Another object of this invention is to provide an improved geophysical instrument for expeditiously measuring weak magnetic fields.

Still another object of this invention is to provide a magnetic flux measuring instrument incorporating improved signal-to-noise features and a 60 db dynamic measurement range.

Other objects and many of the attendant advantages will be readily appreciated as the subject invention becomes better understood by reference to the following detailed description, when considered in conjunction with the accompanying drawings.

BRIEF DESCRIPTION OF THE DRAWING

The sole FIGURE in this case, depicts a combined block and schematic diagram of the variable magnetic flux measuring system constituting this invention.

DESCRIPTION OF THE PREFERRED EMBODIMENT

Figure 1:
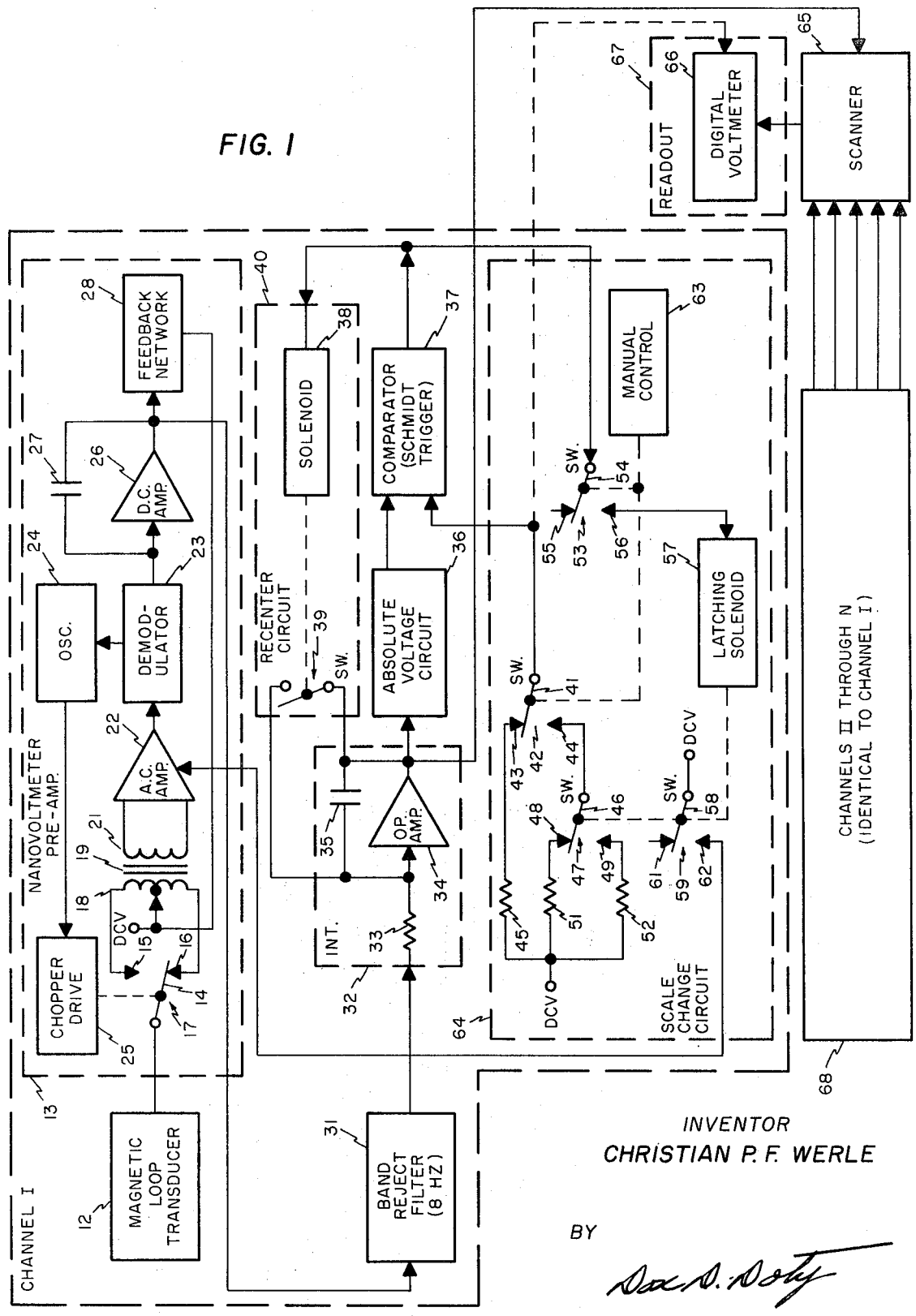

Referring now to FIG. 1, there is shown in a preferred embodiment of a mulit-channel magnetic flux measuring system constituting the subject invention, with channel I thereof illustrated in some detail. Accordingly, said channel I, herewith designated by reference numeral 11, includes a magnetic loop transducer 12 which, in this particular instance, could, for example, constitute an inductive loop containing one or more turns of insulated wire and having a size and geometrical configuration that is suitable for the area and environment involved during any given operational circumstances.

The output of magnetic loop transducer 12 is connected to the input of a low noise nanovolt null detector or nanovoltmeter type of preamplifier. Although any appropriate nanovoltmeter may be used for this purpose, it has been found that a modification of the one entitled MODEL 147 - NANOVOLT NULL DETECTOR, manufactured by the Keithley Instruments, Inc., of Cleveland, Ohio, is eminently suited for such purpose. Nevertheless, it should be understood that other very low noise preamplifiers may be designed and employed as preamplifier 13, as well as some commercially available microvolt meters.

In this particular instance, nanovoltmeter preamplifier 13 has as its input movable arm 14 adapted to be alternately moved in contact with a pair of electrical contacts 15 and 16 of a mechanical chopper 17. Thus, said movable arm 14 is connected to the output of the aforesaid magnetic loop transducer 12. Contacts 15 and 16 of chopper 17 are respectively connected to the end terminals of a center tapped primary winding 18 of a transformer 19, the center tap of which is connected to an adjustable positive direct current voltage. A secondary winding 21 of transformer 19 has its end terminals connected to suitable data inputs of a variable gain alternating current amplifier 22, the output of which is connected to the input of a demodulator 23. One of the inputs of demodulator 23 is connected to the input of an oscillator 24 for the driving thereof at a predetermined frequency, with the output thereof connected to the input of a solenoid chopper drive 25 which, in turn, is mechanically connected to the aforementioned movable arm 14 of choppr 17 for the alternate movement thereof between said contacts 15 and 16. The other output of demodulator 23 is connected to the input of a direct current amplifier 26 having a feedback capacitor 27 connected in parallel therewith, and the output of said direct current amplifier 26 is connected through a feedback network 28 to the center tap of the aforesaid primary winding 18 of transformer 19.

The output of direct current amplifier 26, in this particular instance, constitutes the output of preamplifier 13 and is connected to the input of a band reject filter 31 which is designed in such manner as to delete a predetermined spurious beat or signal having a frequency that would otherwise detract from the data signal being passed therethrough. In this particular instance, it has been found that said spurious signal has a frequency of the order of 8 Hz. The output of band reject filter 31 is connected to the input of an active integrator 32. As shown, it is connected to the input terminal of a resistor 33, the output terminal of which is connected to the input of an operational amplifier 34 which, in turn, is connected in parallel with a capacitor 35. The output of operational amplifier 34 constitutes the output of integrator 32 and is connected to the input of an absolute voltage circuit 36. Absolute voltage circuit 36 is herewith defined as being a circuit that takes the input voltage and produces a positive output voltage with the same level as the input voltage, regardless of whether said input voltage is positive or negative. Thus, it normalizes the voltage that is supplied thereto from operational amplifier 34 of integrator 32. The output of absolute voltage circuit 36 is connected to one of the inputs of a Schmidt trigger voltage comparator 37, the output of which is connected to the solenoid actuator 38 which, when properly energized, mechanically moves the throw of a normally open switch 39 to a closed position. Switch 39, of course, as may readily be seen, is effectively connected in parallel with the aforesaid operational amplifier 34 and capacitor 35. In this particular case, solenoid 38 and switch 39 constitute a voltage recenter circuit 40.

The other input of the aforesaid comparator 37 is connected to the movable arm 41 of a switch 42 having a pair of electrical contacts 43 and 44. As shown, movable arm 41 is shown as being in contact with electrical contact 43, the latter of which is connected through a voltage dropping resistor 45 to a direct current voltage. Contact 44 of said switch 42 is connected to the movable arm 46 of another switch 47 having a pair of electrical contacts 48 and 49. Movable arm 46 of switch 47, in this particular instance, is in electrical contact with contact 48 which is connected through a voltage dropping resistor 51 to the aforesaid direct current voltage. Contact 49 of said switch 47 is connected through a voltage dropping resistor 52 to said direct current voltage. Because electrical contacts are connected as shown to their respective voltage dropping resistors, contacts 43, 48, and 49 have different voltages which may, for example, be of the order of 1 volt, 3 volts, and 10 volts, respectively.

Switch 42 is ganged with another switch 53, the movable arm 54 of which is connected to the other input of the aforementioned comparator 37. Switch 53 has an unconnected contact 55 presently shown in electrical contact with movable arm 54 and a contact 56 which is connected to a latching solenoid 57, which is reset only after switch 53 is opened. The output of solenoid 57 is connected to the movable arm 58 of another switch 59 which is ganged for simultaneous movement with the aforesaid switch 47. Switch 59 has a disconnected electrical contact 61 and another contact 62 which is effectively connected to the gain control input of the aforesaid alternating current amplifier 22 of nanovoltmeter preamplifier 13. The movable arms of switches 42 and 59 are ganged together and connected to a manual control 63 which is preferably adapted for the manipulation thereof by a human operator, although it could obviously be operated by any other suitable utilization apparatus, if so desired. As may readily be seen from FIG. 1, switches 42, 47, 53, and 59, solenoid 57, and manual control 63 combine to constitute a scale change circuit 64.

The output of channel I is taken from the output of operational amplifier 34 of integrator 32 and is connected to the input of a scanner 65, the output of which is connected to digital voltmeter 66 which, in this particular case, constitutes a readout 67. Of course, readout 67 may, if so desired, be any other suitable readout, and may be an indicator and recorder. Moreover, it may be calibrated in terms of magnetic flux, if preferred. Obviously, it would be well within the purview of one skilled in the art having the benefit of the teachings presented herewith to select any particular readout having any particular calibration that would be appropriate for the operational circumstances involved. However, in this particular case, it has been determined that an automatic ranging, optimum resolution digital voltmeter — such as, for example, the one manufactured by Nonlinear Systems, Inc. of Del Mar, California — is quite satisfactory as voltmeter 66 and, thus, readout 67. On the other hand, if a regulatable scale digital voltmeter is employed, the output movable arm 41 of switch 42 may be connected to a voltage range scale input thereof.

In actual practice, only one data processing channel, such as the aforementioned channel I, is necessary to constitute an operational embodiment of the subject invention; however, it should be understood that any number of similarly constructed channels may be incorporated therein, as warranted by operational circumstances. Accordingly, it is herewith disclosed that, on an optional basis, any plurality of channels II through N 68 may also have their respective outputs connected to suitable inputs of the aforesaid scanner 65. Therefore, when one or more channels 68 are combined with the aforementioned channel I in such manner, it may readily be seen that the indication of the outputs thereof in combination with the indication of the output of said channel I constitutes the monitoring of areas which are covered by the respective dispositions of the magnetic loop transducers thereof.

At this time, it should perhaps be noteworthy that all of the individual elements represented in block form in the system of FIG. 1 are well known and conventional per se, with the exception as those indicated as being channels. Therefore, it is to be understood that it is their unique interconnections and interactions that effect the subject invention and cause it to produce the improved results stated above.

MODE OF OPERATION

The operation of the subject invention will now be discussed briefly in conjunction with the sole figure of the drawing.

In order to keep this disclosure as simple as possible the explanation given now will specifically refer to the operation thereof when it is used for the surveillance of ships crossing a predetermined area of the sea, although as previously suggested, it may be used for surveillance of other water, underwater, land, air, and space vehicles or objects, as well.

To implement such surveillance operations, magnetic loop transducer 12 is deployed around the area intended to be guarded. Preferably, it is laid on the sea floor, if feasible and practical; however, any disposition effecting means (not shown) may be combined therewith that will cause it to be located at a particular place and have a particular geometrical configuration. Because transducer 12 ordinarily consists of — but is not necessarily limited to — an insulated signal or multi-conductor electrical cable, the disposition thereof as a loop is ordinarily quite simple. Once properly laid, as a ship traverses it, magnetic loop transducer 12 generates a data or intelligence signal, the voltage of which is proportional to the time-rate of change of the magnetic flux caused to be threaded through it. This data signal voltage, being a varying direct current (DC) voltage is very small in level, must then be amplified to a more useful level by a preamplifier, without adding spurious noise or other signal distortions thereto. Such amplification is facilitated by low-noise nanovoltmeter type preamplifier, preferably of the type depicted as preamplifier 13. Thus, the DC data output signal from transducer 12 is chopped by chopper 17 that is driven by chopper drive 25 and oscillator 24 to become a pulsating DC voltage. Upon further processing by transformer 19, said pulsating DC voltage effectively becomes an alternating current (AC) voltage signal which is then amplified by AC amplifier 22 in accordance with the gain setting signal supplied to the gain control input thereof, as will be discussed in more detail subsequently. This amplified AC voltage data signal is then demodulated to a DC voltage data signal that is proportional to the original DC data signal from magnetic loop transducer 12, but, of course, it is now at a more useful level. It is then amplified further by DC amplifier 26 and smoothed by capacitor 27, so as to make it a suitable output for preamplifier 13.

However, to further perfect the amplification of the input data signal, the output of DC amplifier is sampled by feedback network 28, and the sample is compared with the input data signal in primary winding 18 of transformer 19. Transformer 19, of course, increases the voltage difference signal between the two. This voltage difference is amplified by AC amplifier 22 which also filters out line-frequency sidebands. It is then demodulated, DC amplified, and filtered by demodulator 23, amplifier 26, and feedback capacitor 27, respectively.

Once the aforementioned internal operation of preamplifier 13 has reached a state of equilibrium, the output signal thereof is an exceedingly high fidelity signal that represents — that is, is proportional to — the change in magnetic field being sensed by transducer 12 at any given instant.

As previously indicated, preamplifier 13 may be any that processes data signal supplied thereto in such manner that an amplified data signal having an exceedingly high signal-to-noise ratio is obtainable therefrom within a broad dynamic range. Since no other known conventional preamplifier has performed satisfactorily for such purpose, the circuit described above was selected as being optimum at the present time. Nevertheless, in the event a higher fidelity amplifier ever becomes available, it should be understood that it, too, may be employed as preamplifier 13 in the instant invention. Accordingly, the aforesaid preamplifier 13 has been disclosed herein without limitation.

The output data signal of preamplifier 13 is supplied to the input of band reject filter 31. Since strong third harmonic fields from other electrical instruments located near the subject invention usually create an 8 Hz beat in said data signal, said beat must be filtered out; thus, filter 31 is used for such prupose. Then said filtered data signal is integrated by RC active network integrator 32, designed as shown for its extreme accuracy.

After integration, the data signal is converted to the equivalent positive absolute voltage value, regardless of the polarity thereof when it is supplied thereto. This, in effect, normalizes the data signal before it is applied to voltage comparator 37 for comparison with preset reference voltages supplied thereto from monitor-record switch 42.

When switch 42 (and switch 53) is manually positioned in the monitor position, so that the movable arm 41 thereof is in contact with contact 43, 1 volt is supplied to the other input of comparator 37. This is due to the fact that voltage dropping resistor 45 is designed to have whatever resistance is necessary to drop the DC voltage supplied thereto to one volt. And when the output signal from absolute voltage circuit 36 reaches 1 volt, comparator 37 generates a pulse which energizes solenoid 38 and causes switch 39 to be closed. Of course, closure of switch 39 shorts out and discharges capacitor 35 of integrator 32, thereby effectively preventing integrator 32 from saturating while switch 53 is in the monitor position. In the meantime, whenever the voltage stored by integrator 32 is less than 1 volt, it is read out as such by readout 67.

When manual control 63 is actuated to the record position, switches 42 and 53 are closed in such manner that movable arms 41 and 54 are made to contact electrical contacts 44 and 56, respectively. Then, as a result of a predetermined voltage drop occurring across resistor 51, and because movable arm 46 is in its normally closed position with electrical contact 48, a reference voltage of 3 volts is applied to the reference voltage input of comparator 37. This, in turn, allows the data signal output from integrator 32 to be read out by readout 67 within the 0 to 3 volt range. Of course, once said data signal exceeds 3 volts, comparator 37 is acturated, produces a pulse that energizes solenoid 40 that, in turn closes switch 39 of recenter circuit 40, to thereby effect the discharge of capacitor 35 of integrator 32.

The aforesaid pulse from comparator 37 (produced as a result of the signal from absolute circuit 36 reaching the aforementioned 3 volt reference voltage) travels through closed arm 54 and contact 56 of switch 52 and energizes solenoid 57. The energization thereof, in turn, moves movable arms 46 and 58 to cause them to respectively make contact with electrical contacts 49 and 62 of switches 47 and 59. At such time, because resistor 52 is so designed, 10 volts is applied to the reference voltage input of comparator 37, thereby preventing the closure of switch 39 and the shorting of capacitor 35 until the data signal from absolute voltage circuit 36 reaches 10 volts. In addition, because movable arm 58 of switch 59 has been put in contact with electrical contact 62, a predetermined direct current voltage is supplied to the gain control input of the aforesaid A.C. amplifier 22 to effectively decrease the gain thereof to an optimum level for effecting the readout of the data signal from integrator 32 by digital voltmeter 66 of readout 67.

From the foregoing, it may be seen that the combination of recenter circuit 40, scale change circuit 64, and readout 67 causes an analog representation of the magnetic flux sensed by transducer 12 to be indicated and/or recorded on an optimum readable range scale of digital voltmeter 66 or any other suitable readout 67.

In the event only one channel is being used, the aforementioned operational procedure occurs therein, and in the event two or more channels are being used, operational procedures similar to that occurring in channel I are occurring in each thereof, depending upon a rate of change of magnetic flux passing through their respective loop transducers.

In the latter event, each channel output is successively scanned by scanner 65, and the data signals therefrom are, thus, timely and successively read out by readout 67. Of course, such a readout may be indicative of the direction a ship or other object is traversing any particular area being monitored by the mulitchannel species of the invention.

In view of the foregoing, it may readily be seen that the instant invention accomplishes its objectives in a simple but extremely accurate manner not heretofore obtained from any known devices. Hence, it constitutes a considerable improvement over the prior art.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. In a magnetic flux meter, a channel comprising in combination:

an inductive loop transducer means for producing an electrical output signal that is proportional to the rate of change of the magnetic flux passing therethrough at a predetermined environmental location;

controllable means connected to the output of said inductive loop transducer means for amplifying with high fidelity the electrical signal therefrom;

means connected to the output of said controllable amplifying means for filtering said amplified electrical signal in such manner that a predetermined spurious component thereof is deleted therefrom;

means connected to the output of said filtering means for integrating said filtered electrical signal;

means connected to said integrating means for the discharging thereof in response to a predetermined reset signal;

means effectively connected to the output of said integrating means for timely comparing the voltage of the output therefrom with a plurality of predetermined manually effected reference voltages and for producing the aforesaid predetermined reset signal whenever equal input voltages are compared thereby;

means connected to the output of said voltage comparing means for manually effecting the varying of said reference voltages in accordance with predetermined voltage ranges;

means connected to said reference voltage varying means, effectively connected to said voltage comparing means, and connected to said controllable amplifying means for selectively regulating the gain thereof; and means effectively connected to the aforesaid reference voltage varying means and the output of said integrating means of the aforesaid channel for reading out the integrated electrical signal therefrom on range scales thereof that are proportional thereto and optimum for the indication thereof in response to the aforesaid manually effected reference voltages.

2. The device of claim 1, wherein said inductive loop transducer means for producing an electrical output signal that is proportional to the rate of change of the magnetic flux passing therethrough at a predetermined environmental location comprises at least one coil of insulated electrical wire.

3. The device of claim 1, wherein said controllable means connected to the output of said inductive loop transducer means for amplifying with high fidelity the electrical signal therefrom comprises a null detector nanovoltmeter amplifier.

4. The device of claim 1, wherein said means connected to the output of said controllable amplifying means for filtering said amplified electrical signal in such manner that a predetermined spurious component thereof is deleted therefrom comprises a band reject filter.

5. The device of claim 1, wherein said means connected to the output of said filtering means for integrating said filtered electrical signal comprises:

a resistor having a pair of terminals, with one of the terminals thereof connected to the output of said filtering means;

an operational amplifier connected to the other terminal of said resistor; and a capacitor connected in parallel with said operational amplifier.

6. The device of claim 1, wherein said means connected to said integrating means for discharging thereof in response to a predetermined reset signal comprises:

a normally open switch effectively connected in parallel with said integrating means; and a solenoid connected to said switch in such manner as to effect the closure thereof in response to the aforesaid predetermined reset signal.

7. The device of claim 1, wherein said means effectively connected to the output of said integrating means for timely comparing the voltage of the output thereof with a plurality of predetermined reference voltages and for producing the aforesaid predetermined reset signal whenever equal input voltages are compared thereby comprises a Schmidt trigger.

8. The device of claim 1, wherein said means connected to the output of said voltage comparing means for manually effecting the varying of said reference voltages in accordance with predetermined voltage ranges comprises:

a first direct current voltage;

a first resistor having a pair of terminals; with one of the terminals thereof connected to said first direct current voltage;

a second resistor having a pair of terminals, with one of the terminals thereof connected to said first direct current voltage;

a third resistor having a pair of terminals, with one of the terminals thereof connected to said first direct current voltage;

a first double contact single throw switch, with one of the contacts thereof connected to the other terminal of said first resistor, and with the throw thereof normally closed with said one contact;

a second double contact single throw switch, with one of the contacts thereof connected to the other terminal of said second resistor, with the throw thereof normally closed with said one contact and connected to the other contact of the aforesaid first switch, and with the other contact thereof connected to the other terminal of said third resistor;

a second direct current voltage;

a third double contact single throw switch, with one of the contacts thereof disconnected, with the throw thereof normally closed with said disconnected contact and connected to said second direct current voltage, and with the other contact thereof connected to the control input of the aforesaid controllable amplifying means;

a solenoid having a mechanical output and an electrical input, with the mechanical output thereof connected to the throws of said second and third switches for movement thereof into contact with the other contacts of said second and third switches in response to an electrical signal supplied to the electrical input thereof;

a fourth double contact single throw switch, with one of the contacts thereof disconnected, with the throw thereof normally closed with said disconnected contact and connected to the output of the aforesaid voltage comparing means, and with the other contact thereof connected to the electrical input of said solenoid; and means connected to the throws of said first and fourth switches for the movement thereof into contact with the other contacts thereof, respectively.

9. The device of claim 1, wherein said means connected to said reference voltage varying means, effectively connected to said voltage comparing means, and connected to said controllable amplifying means for selectively regulating the gain thereof comprises:

a latching solenoid;

a first normally open switch having a movable arm and an electrical contact adapted for being contacted by said movable arm, with the movable arm thereof electrically connected to the output of said voltage comparing means and mechanically connected to the aforesaid manual reference voltage varying means, and with the electrical contact thereof connected to the input of said latching solenoid;

a direct current voltage; and a second normally open switch having a movable arm and an electrical contact adapted for being contacted by said movable arm, with the movable arm thereof mechanically connected to the output of said latching solenoid, and with the electrical contact thereof effectively connected to the gain control input of the aforesaid controllable amplifying means.

10. The device of claim 1, wherein said means effectively connected to the aforesaid reference voltage varying means and the output of said integrating means of the aforesaid channel for reading out the integrated electrical signal therefrom on range scales thereof that are proportional thereto and optimum for the indication thereof in response to the aforesaid manually effected reference voltages comprises an automatic ranging-optimum resolution digital voltmeter.

11. The invention of claim 1, further characterized by:

another channel substantially identical to the aforesaid channel, but with the inductive loop transducer means thereof disposed at a predetermined environmental location that is different from the predetermined environmental location of the inductive loop transducers of the aforesaid channel; and means connected between the outputs of said channels and the input of the aforesaid readout means for timely scanning the integrated electrical signals from said channels and successively supplying them to the input of said readout means for indication and recording thereof thereby in terms of magnetic flux parameters.

* * * * *